Patented Oct. 21, 1952

2,615,045

UNITED STATES PATENT OFFICE 2,615,045

PREPARATION OF DIARYLGUANIDINES

Donald W. Kaiser, Old Greenwich, and Paul F. Hopper, Greenwich, Conn., assignors to American Cyanamid Company, New York, N. Y., a corporation of Maine No Drawing. Application October 23, 1950, Serial No. 191,720

8 Claims. (Cl. 260—565)

The present invention relates to the preparation of symmetrical diarylguanidines.

It is an object of the invention to prepare the symmetrical diarylguanidines more cheaply and efficiently than has been possible in the past. It is a still further object to react a cyanogen halide with a primary aromatic amine in the presence of water under conditions such that the yield of the resulting symmetrical diarylguanidine is very high. Additional objects will be apparent from the discussion hereinafter.

It is old in the art to make a diarylguanidine by adding an aromatic amine such as aniline to an aqueous solution of a cyanogen halide such as cyanogen chloride in aqueous solution. See for example British Patent 255,220. That process, however, is subject to several disadvantages. For example, when aniline is added to a solution of cyanogen chloride in water the reaction is exothermic and the solution must be kept cool, preferably at about 0°–10° C., to prevent the cyanogen chloride from boiling away. The initial product so obtained in the process exemplified by the British patent is not diphenylguanidine but phenylcyanamide (cyan-anilide). After the preparation of the insoluble phenylcyanamide is complete, the solution is then heated to 90° C. for about 4 hours to convert the phenylcyanamide to diphenylguanidine hydrochloride. The latter reaction is endothermic and will not proceed appreciably in the absence of applied heat.

It was previously believed that when adding a cyanogen halide to an aqueous mixture of an aryl amine, a considerable amount of amine salt had to be present initially to prevent side reactions and furthermore the amine base had to be maintained in great excess throughout the reaction. (See for example U. S. Patent 1,794,875.)

The surprising discovery has now been made that a cyanogen halide can be added to an aqueous solution of a primary aromatic amine which includes no amine salt, with the virtually complete conversion of the amine to diarylguanidine, leaving no amine to be recovered for re-use, and further that the reaction can be carried out safely with negligible formation of by-products provided that a certain critical pH is not exceeded when adding the cyanogen halide to the mixture of amine and water. In general the invention contemplates adding cyanogen halide to a mixture of aromatic amine and water at a temperature ranging up to about 100° C., stopping the addition of cyanogen halide at a certain critical pH, which final pH depends principally upon the initial concentration of the amine, followed by heating the resultant solution at a temperature of at least 70° C., and preferably 80°–100° C. until the formation of the corresponding diarylguanidine salt is complete. From this point the recovery of the thus-formed diarylguanidine salt proceeds as is well known in the art, namely by diluting the solution further with water and precipitating the free diarylguanidine by means of an alkali such as caustic soda.

It will be seen that the essence of the invention resides in stopping the addition of the cyanogen halide when the reaction solution reaches a certain critical pH value, as set forth more fully hereinafter. If the addition of the cyanogen halide is continued beyond this critical value so that the reaction mixture becomes more acidic, it has been found that considerable amounts of undesirable by-products such as phenylurea and the like are formed. It is believed that a condition more acidic than the critical pH encourages the conversion of the intermediate arylcyanamide to arylurea, diarylurea, ammonium chloride, etc., rather than to diarylguanidine. However, the inventors do not wish to be bound by any supposed explanation of how the formation of by-products is avoided. The critical pH, while varying with the concentration of the reaction mass, as set forth more fully hereinafter, is always between the range of 2.3–3.0.

The critical pH range of 2.3–3.0 applies to the general reaction of a cyanogen halide with an arylamine in water. The cyanogen halide can be either the chloride or the bromide, and the aryl amine can be any of those known to react with a cyanogen halide to give the corresponding diarylguanidine. For example, the following primary aryl amines are suitable: 2-amino-1,4-dimethylbenzene, 5-amino-1,3-dimethylbenzene, o-aminodiphenyl, β-naphthylamine, α-naphthylamine, o-anisidine, p-chloroaniline, p-nitroaniline, 3,5-diethoxyaniline, cumidine, and mixed xylidines.

The following examples illustrate without limiting the invention.

EXAMPLE 1

*Preparation of diphenylguanidine*

A 750 gallon kettle equipped with stirrer, steam jacket, reflux condenser, and pump to circulate the reaction mass around a pair of high temperature pH electrodes stationed outside the vessel, was charged with 1600 lbs. of aniline and 800 lbs. of water. The kettle was closed and the solution was heated to about 100° C. with stirring, while cyanogen chloride was passed into the kettle above the fluid surface at the rate of about 2½ lbs./min. (or the gas can be passed directly into the liquid if desired). When the pH of the reaction mass dropped to 2.85 the cyanogen chloride gas was shut off. Thereafter the kettle was refluxed at 100° C. for 3 hours to complete the conversion of phenylcyanamide to diphenylguanidine hydrochloride. Free diphenylguanidine was obtained in the usual way by reacting its hydrochloride salt with caustic soda. The yield was approximately quantitative. This example sets forth the preferred conditions for practising the invention.

EXAMPLE 2

The criticality of stopping the reaction at the proper pH is shown by the following experiment.

A solution of 186 parts by weight of aniline in 100 parts of water maintained at 80°-90° C. was gassed with cyanogen chloride until the pH had fallen to 2.7. Thereafter an additional 3.7 parts of cyanogen chloride was added, causing the pH to drop sharply to about 1.5. On cooling, 75 parts of impure phenylurea precipitated. This was filtered and the filtrate worked up to provide a 50% yield of diphenylguanidine, as against a nearly theoretical yield when the pH is stopped at 2.7 under the same conditions of temperature and concentration.

The procedure of the present invention is particularly adapted to the use of commercial cyanogen chloride, which contains varying amounts of acidic materials, such as HCl, $Cl_2$, and HCN. Regardless of the amounts of acidic contaminants, it has been found that they do not cause the formation of by-products if the reaction is not carried beyond the critical pH.

As stated above, the final pH depends largely upon the concentration of the original amine-water solution. The following table shows at what pH range the addition of cyanogen halide should be stopped to prevent formation of by-products while utilizing almost quantitatively the amount of arylamine present.

| Wt. percent $H_2O$ in amine-$H_2O$ solution | pH range |
|---|---|
| 10 | 2.3-2.5 |
| 20 | 2.4-2.6 |
| 30 | 2.6-2.8 |
| 35 | 2.6-2.9 |
| 50 | 2.7-2.9 |
| 75 | 2.8-3.0 |

Other factors being constant, it has been found that the pH ranges vary very slightly (one or two tenths of a pH point) with the speed of adding cyanogen halide and with the temperature of the reaction mass. However, the ranges given are accurate for cyanogen halide additions requiring up to about 8 hours and for temperatures from 0° C. up to about 100° C. In commercial practice it is preferred to adjust the flow of cyanogen halide such that the critical pH is reached within 1-5 hours. The preferred temperature for adding the cyanogen halide is 80°-100° C.

EXAMPLE 3

*Preparation of di-o-tolylguanidine*

Following the same procedure of Example 1, 268 parts of o-toluidine in 94 parts of water (35% $H_2O$) was gassed with cyanogen chloride while maintaining the temperature of the reaction mass at 90°-95° C., until the pH dropped to about 2.6, at which point the cyanogen chloride was shut off. The reaction mass then was maintained at 90°-95° C. for 3 hours to complete the reaction, after which the di-orthotolylguanidine hydrochloride was neutralized with caustic soda to provide a 95-96% yield of the free base.

While the invention has been described with particular reference to specific embodiments, it is to be understood that it is not to be limited thereto but is to be construed broadly and restricted solely by the scope of the appended claims.

We claim:

1. In the method of making a symmetrical diaryl guanidine by adding a cyanogen halide to a mixture consisting essentially of water and a primary aromatic amine free from interfering substituents, the improvement that comprises stopping the addition of the cyanogen halide when the pH of the reaction mix solution reaches a value in the range of substantially 2.3-3.0.

2. The method according to claim 1 in which diphenylguanidine is made by steps comprising adding cyanogen chloride to aniline in water.

3. The method according to claim 2 in which the amine water weight ratio is about 2:1.

4. The method according to claim 3 in which the aqueous solution of aniline is gassed with cyanogen chloride until the pH of the reaction mass falls to a point within the range of about 2.6-2.9.

5. The method according to claim 4 in which the reaction mass is maintained at about 100° C. during the cyanogen chloride addition.

6. The method according to claim 1 in which the amine is toluidine.

7. The method according to claim 1 in which the amine is a xylidine.

8. The method that comprises subjecting a 65% aqueous solution of aniline to the action of cyanogen chloride until the pH of the reaction mass is about 2.8, while maintaining the reaction temperature at about 100° C., and thereafter heating the reaction mass at a temperature of at least 80° C. to complete the reaction.

DONALD W. KAISER.
PAUL F. HOPPER.

REFERENCES CITED

The following references are of record in the file of this patent:

UNITED STATES PATENTS

| Number | Name | Date |
|---|---|---|
| 1,611,941 | Osborne | Dec. 28, 1926 |
| 1,784,442 | Heuser | Dec. 9, 1930 |
| 1,794,875 | Tschunkur et al. | Mar. 3, 1931 |

FOREIGN PATENTS

| Number | Country | Date |
|---|---|---|
| 478,525 | Great Britain | Jan. 20, 1938 |

OTHER REFERENCES

Naunton: "J. Soc. Chem. Ind.," Nov. 5, 1926, pp. 377T-378T.